(12) United States Patent
Mandan et al.

(10) Patent No.: US 9,909,072 B2
(45) Date of Patent: Mar. 6, 2018

(54) PROCESS FOR THE PRODUCTION OF BIO-OIL

(71) Applicant: RELIANCE INDUSTRIES LIMITED, Mumbai, Maharashtra (IN)

(72) Inventors: Chidambaram Mandan, Nadu (IN); Kshudiram Mantri, West Bengal (IN); Supriya Apegaonkar, Maharashtra (IN); Ramesh Bhujade, Maharashtra (IN); Nagesh Sharma, Gujarat (IN); Raksh Vir Jasra, Gujarat (IN)

(73) Assignee: Reliance Industries Limited, Mumbai (IN)

( * ) Notice: Subject to any disclaimer, the term of this patent is extended or adjusted under 35 U.S.C. 154(b) by 171 days.

(21) Appl. No.: 14/796,335

(22) Filed: Jul. 10, 2015

(65) Prior Publication Data

US 2015/0329789 A1    Nov. 19, 2015

Related U.S. Application Data

(63) Continuation-in-part of application No. 14/652,283, filed as application No. PCT/IN2014/000313 on May 8, 2014.

(30) Foreign Application Priority Data

Sep. 6, 2013   (IN) .......................... 2899/MUM/2013
Jul. 11, 2014  (IN) .......................... 2269/MUM/2014

(51) Int. Cl.
| | | |
|---|---|---|
| *B01J 27/24* | (2006.01) | |
| *C10G 3/00* | (2006.01) | |
| *C10G 1/00* | (2006.01) | |
| *B01J 37/03* | (2006.01) | |
| *B01J 21/04* | (2006.01) | |
| *B01J 21/06* | (2006.01) | |
| *B01J 23/46* | (2006.01) | |
| *B01J 23/882* | (2006.01) | |
| *B01J 23/883* | (2006.01) | |
| *B01J 27/16* | (2006.01) | |
| *B01J 29/04* | (2006.01) | |
| *B01J 37/02* | (2006.01) | |
| *C10L 9/08* | (2006.01) | |
| *C10L 1/32* | (2006.01) | |

(52) U.S. Cl.
CPC ................ *C10G 3/00* (2013.01); *B01J 21/04* (2013.01); *B01J 21/066* (2013.01); *B01J 23/464* (2013.01); *B01J 23/882* (2013.01); *B01J 23/883* (2013.01); *B01J 27/16* (2013.01); *B01J 29/041* (2013.01); *B01J 29/045* (2013.01); *B01J 37/0203* (2013.01); *B01J 37/036* (2013.01); *C10G 1/00* (2013.01); *C10G 3/46* (2013.01); *C10G 3/49* (2013.01); *C10G 3/50* (2013.01); *C10L 1/326* (2013.01); *C10L 9/086* (2013.01); *Y02P 30/20* (2015.11)

(58) Field of Classification Search
CPC ............ C12Q 1/6806; C12Q 2521/301; C12Q 2521/531; C12Q 2523/303; B01J 21/04; B01J 21/066; B01J 23/464; B01J 23/882; B01J 23/883; B01J 27/16; B01J 29/041; B01J 29/045; B01J 37/0203; B01J 37/036; C10G 1/00; C10G 3/00; C10G 3/46; C10G 3/49; C10G 3/50; C10L 1/326; C10L 9/086
See application file for complete search history.

(56) References Cited

U.S. PATENT DOCUMENTS 9,034,782 B2 *  5/2015  Thota .................... B01J 27/188
                                                    502/113
2012/0055077 A1 * 3/2012  Savage ................... C10L 1/02
                                                    44/307

FOREIGN PATENT DOCUMENTS

EP          2586527 A1 *  5/2013

OTHER PUBLICATIONS

English translation of copending Indian Application No. 2899/MUM/2013.

* cited by examiner

*Primary Examiner* — Sharon Pregler
(74) *Attorney, Agent, or Firm* — Ladas & Parry LLP

(57) ABSTRACT

The present disclosure relates to a process for the production of bio-oil which involves heating a mixture of a biomass slurry and a first catalyst composition at a temperature ranging from 200 to 350° C. and at a pressure ranging from 70 to 250 bars to obtain a mass containing crude bio oil, a residue and the catalyst; separating the crude bio oil from said mass to obtain a separated crude bio oil; extracting said separated crude bio oil with at least one solvent and evaporating said solvent to obtain a solvent free crude bio oil; subjecting said solvent free crude bio oil to reduction in the presence of a second catalyst composition and hydrogen source at temperature and pressure conditions similar to those employed for the conversion of bio mass into crude bio oil to obtain bio-oil. The second catalyst composition is the same as that of the first catalyst composition. The process also comprises a method step of recovering the first catalyst and reusing it either for preparing crude bio oil or bio oil or both.

17 Claims, 4 Drawing Sheets

PROCESS FOR THE PRODUCTION OF BIO-OIL

CROSS REFERENCE APPLICATIONS

Figure 1:
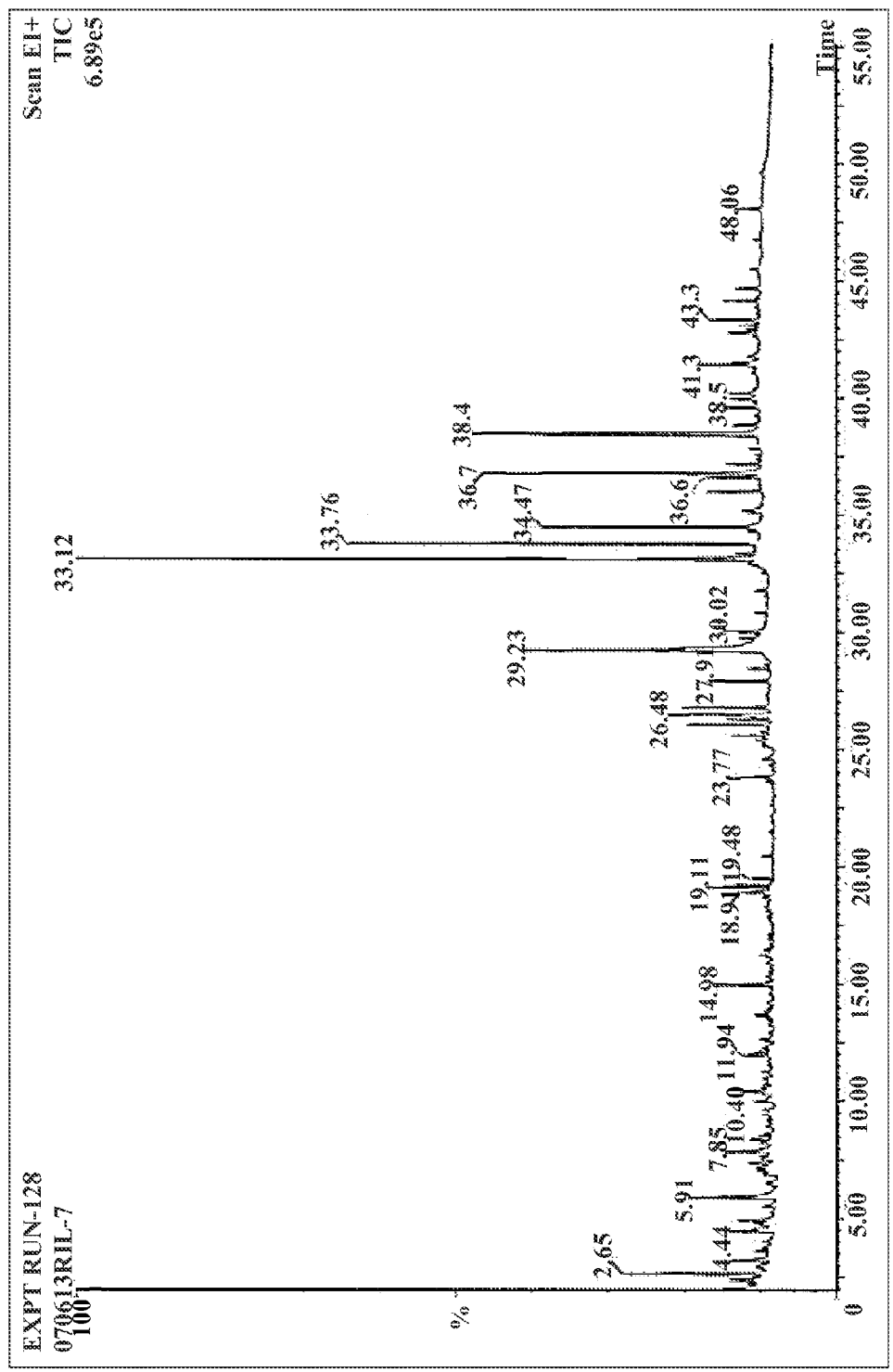

This application is a continuation-in-part of U.S. Ser. No. 14/652,283 filed Jun. 15, 2015 which is a 371 of International Application PCT/IN2014/000313 filed May 8, 2014 which claims the benefit of Indian Application No. 2899/MUM/2013 06 filed September 2013, the content of which is incorporated herewith by reference and further claims priority from Indian Application No.: 2269/MUM/2014 filed Jul. 11, 2014.

FIELD

The present disclosure relates to a process for the production of crude bio-oil and its up-gradation to bio-oil using a catalyst composition.

Definitions

Biomass

The term biomass in the context of the present disclosure means material such as organic waste, urban refuse, wood, agricultural crops or wastes, municipal wastes and the like, which can be used as a source of fuel or energy.

Crude Bio-Oil

The term crude bio-oil used in the context of the present disclosure means an oil or biofuel derived from biomass before it is refined for use as an alternative to petroleum fuel.

BACKGROUND

Biomass, a renewable energy source, can either be used directly via combustion to produce heat, or indirectly after converting it to various forms of biofuels. Biofuels are derived from biomass and are intended to provide an alternative to petroleum fuels. Conversion of biomass to biofuel can be achieved by different methods which are broadly classified into thermal, chemical and biochemical methods.

Fossil fuels such as petroleum, natural gas and coal are typically formed through the processes of thermochemical conversion (TCC) from biomass buried beneath the ground.

TCC is a chemical reforming process of biomass in a heated and usually pressurized, oxygen deprived enclosure, where long-chain organic compounds break into short-chain hydrocarbons such as syngas or oil. TCC is a broad term that includes gasification, including the Fisher-Tropsch process, direct liquefaction, hydrothermal liquefaction and pyrolysis.

Pyrolysis is a heating process of dried biomass to directly produce syngas and/or oil. Both gasification and pyrolysis require dried biomass as feedstock and the processes occur in an environment higher than 600° C.

Hydrothermal liquefaction (HTL) is a technology for converting high-moisture waste biomass into energy dense "crude bio-oil" that can be used for direct combustion or refined for transportation grade fuels.

HTL, also called hydrous pyrolysis, is a process for the reduction of complex organic materials such as bio-waste or biomass into crude oil and other chemicals.

Hydrothermal Liquefaction (HTL) technique, which involves the application of heat and pressure on the biomass medium, has an advantage that the lipids and other organic components can be efficiently converted while the biomass is in wet condition. During HTL, high moisture biomass is subjected to elevated temperature (250-400° C.) and pressure (up to 225 bars) in order to break down and reform the chemical building blocks into crude bio oil. HTL of biomass gives only crude bio oil that needs to be further treated/refined to get finished crude oil products. The hydrothermal process breaks down bio macromolecules in the wet biomass and promotes heteroatom removal.

Some of the representative patent documents which suggest conversion of biomass to upgraded bio-oil via crude bio oil are discussed herein below.

US20120055077 suggests a method of producing an upgraded bio-oil from a wet biomass which involves heating the wet biomass at a first temperature (200 to 400° C.) and a first pressure (0.1 to 25 MPa) for a time period ranging from 10 to 200 minutes to form a crude bio-oil and heating the crude bio-oil and water at a second temperature and a second pressure for a time period of at least 30 minutes to form the upgraded bio-oil, wherein the second temperature is greater than the first temperature and is at least 300° C.

However, the process suggested in US20120055077 has the drawback that it requires stringent reaction conditions to be maintained throughout. As per the procedure suggested in US20120055077, the biomass is subjected to heat twice i.e. heating at a first temperature and at a first pressure followed by heating at a second temperature and at a second pressure. The first temperature and first pressure are below supercritical conditions of water; whereas the second temperature and second pressure are at or near supercritical conditions of water. In the first heating step, the reaction must be controlled in such a manner that at least a portion of the water present in the wet biomass remains in liquid phase throughout the step of heating to form the crude bio-oil. Further, in the second heating step, the crude bio oil is converted into upgraded bio-oil only in the presence of water; the crude bio-oil and water must be heated in such a manner that some water remains in the liquid phase or in a super-critical fluid phase throughout the step of heating to form the upgraded bio-oil. Still further, the catalysts employed in the process suggested by US 20120055077 are heterogeneous catalyst containing Pd/C, Pt/C, Ru/C, Ni/SiO2-Al2O3, sulfided CoMo/γ-Al2O3, zeolite, activated carbon, and combinations thereof.

Considering the complexity associated with the suggested process, there is a need for a simple, energy efficient, time saving and high yielding process for the conversion of biomass into crude bio oil and its up-gradation into bio-oil.

OBJECTS

Some of the objects of the present disclosure, which at least one embodiment herein satisfies, are as follows:

It is an object of the present disclosure to provide a process for the production of crude bio oil and its up-gradation to bio-oil using a regenerable and recyclable catalyst.

It is another object of the present disclosure to provide a simple, energy efficient, time saving and high yielding process for the production of crude bio oil and its up-gradation to bio-oil.

It is another object of the present disclosure to provide a process in which the upgradation of crude bio oil to bio-oil is carried in the absence of solvent.

It is another object of the present disclosure to provide a process in which the temperature and pressure parameters for the conversion of biomass into crude bio oil and subsequent upgradation of crude bio oil to bio-oil are similar.

It is a still another object of the present disclosure to provide a process which is capable of producing bio-oil compatible with crude used in the refinery process.

It is yet another object of the present disclosure to provide a process which is capable of producing bio-oil containing high carbon content.

It is yet another object of the present disclosure to provide a process which is capable of producing bio-oil which is free from heteroatoms such as oxygen, nitrogen, sulfur and phosphorus.

Other objects and advantages of the present disclosure will be more apparent from the following description which is not intended to limit the scope of the present disclosure.

SUMMARY

The present disclosure relates to a process for the conversion of crude bio oil into bio oil. The crude bio oil is prepared in accordance with the process using the catalyst composition as disclosed in the co-pending patent application 2899MUM2013, to which this patent application is a patent of addition. In accordance with the present disclosure the temperature and pressure parameters for preparing bio oil are similar or slightly higher than that required for the preparation of crude bio oil from crude biomass. Further, the preparation of crude bio oil from crude biomass in accordance with the process of the present disclosure is carried out in the absence of a solvent. The purpose of upgrading the crude bio oil to bio oil is to make the bio oil compatible with the petroleum crude oil. This is achieved by removing heteroatoms such as nitrogen, oxygen and sulphur by subjecting the crude oil to upgradation process of the present disclosure.

BRIEF DESCRIPTION OF ACCOMPANYING DRAWINGS

Figure 2:
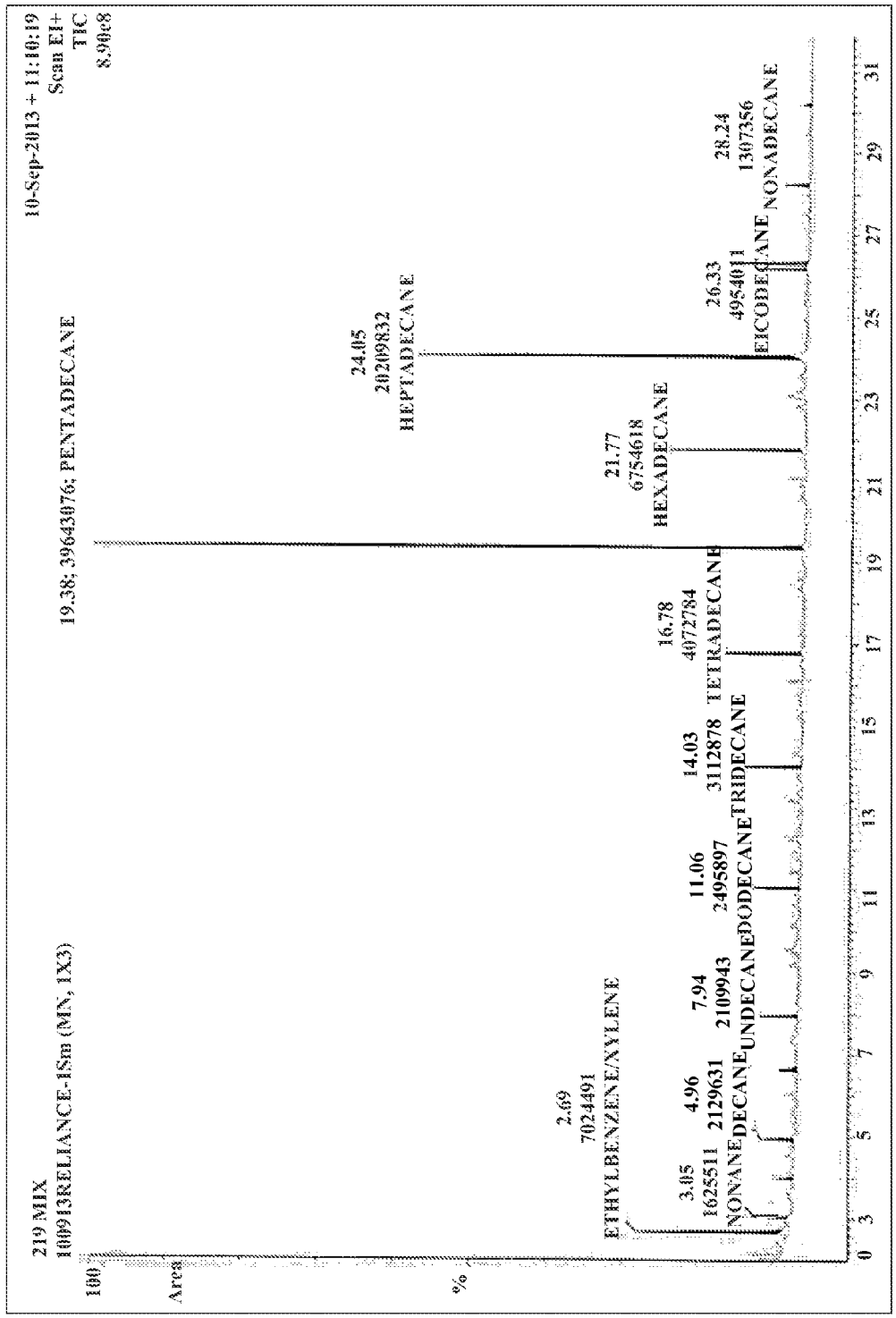
Figure 3:
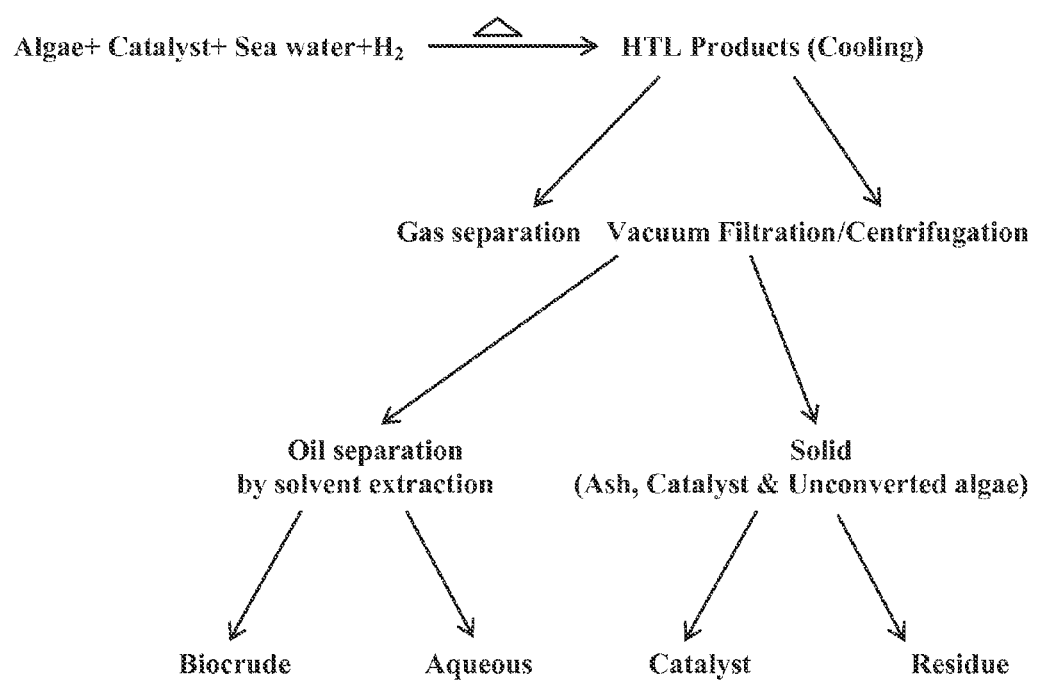

The disclosure will now be explained in relation to the non-limiting accompanying drawings, in which:
FIG. 1—illustrates gas chromatogram of crude bio oil;
FIG. 2—illustrates gas chromatogram of bio oil;
FIG. 3—illustrates a flowchart for the preparation of crude bio oil; and
FIG. 4—illustrates a flowchart for the preparation of bio-oil.

DETAILED DESCRIPTION

The co-pending patent application No. 2899/MUM/2013 overcomes the drawbacks associated with the known hydrothermal liquefaction methods for conversion of biomass to crude bio oil, such as time consumption, energy consumption and low yield and discloses a simple, energy efficient, time saving and high yielding process for hydrothermal conversion of biomass into bio-crude. The co-pending patent application No. 2899/MUM/2013 particularly provides a method for the preparation of a catalyst at room temperature having improved catalytic activity when used for hydrothermal conversion of biomass into crude bio oil. However, the crude bio oil obtained is incompatible with petroleum crude oil as it contains free fatty acids, N-containing heterocyclic compounds, polycyclic aromatics, unsaturated compounds and other undetectable heavier molecules. To make the crude bio oil compatible with the petroleum crude oil, the crude bio oil needs to be upgraded.

The present disclosure focuses on the upgradation of crude bio oil to bio oil.

Particularly, the present disclosure provides for up-gradation of crude bio oil to bio-oil in the absence of a solvent, and which is carried out essentially at temperature and pressure conditions similar to those of conversion of biomass to crude bio oil.

The process of the present disclosure is simple, efficient and time saving as it does not require temperature & pressure conditions to be maintained near the supercritical conditions of water. The heating of biomass slurry to form crude bio-oil does not require water to be present in liquid phase throughout the reaction. Also, the conversion of crude bio-oil into upgraded bio-oil does not require water, either in liquid phase or in a super-critical fluid phase.

Figure 4:
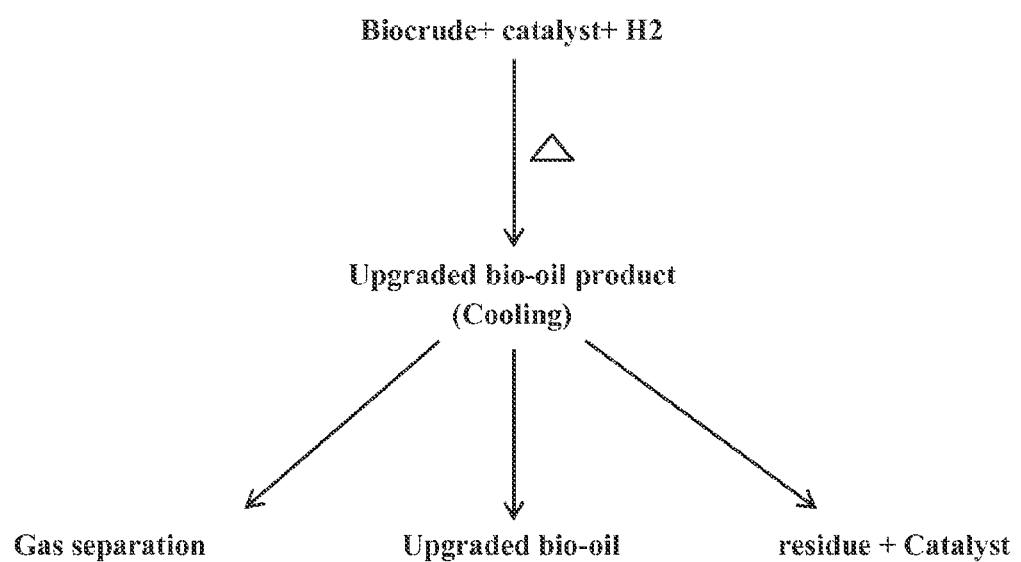

Accordingly, the present disclosure provides a process for the production of crude bio oil and its up-gradation to bio-oil. A flowchart for the process of preparing crude bio oil (CBO) is depicted in FIG. 3, and a flowchart for the process of preparing upgraded bio-oil (UBO) is depicted in FIG. 4. The Process Involves the Following Steps In the first step, slurry of a bio-mass is prepared in a medium. The concentration of the biomass in the slurry ranges from 5 to 35 wt %. The biomass utilized for preparing slurry includes but is not limited to organic waste, agricultural residues, urban refuse, land- and water-based plant material and microorganism and the medium includes water or demineralized water. In one embodiment, the biomass is algae division selected from the group of divisions consisting of Rhodophyta, Chlorophyta, Phaeophyta, Chrsophyta, Cryptophyta, Dinophyta, Tribophyta, Glaucophyta, Charophyta, Ochrophyta, Protista and Blue green algae (Cyanobacteria).

Particularly, the algae is selected from the group consisting of *Spirulina, Nannochloropsis, Chlorella, Euglena, Microcystis, Dictyosphaerium Anabaena, Nodularia, Oscillatoria, Spirogyra, Hydrodictyon, Chara, Nitella, Oedognium, Phormidium* and the like.

The source and geographical origin of the algae used in the present disclosure, for the production of bio oil, is as follows:
*Spirulina*—obtained from India (Uttar Pradesh & Tamil Nadu)
*Nannochloropsis*—obtained from USA, China and Belgium
*Chlorella*—obtained from India (Gujarat & Andhra Pradesh)

In the second step, a first catalyst composition is added to the slurry to obtain a mixture. The amount of the first catalyst composition added to the slurry ranges from 1 to 20 wt. % with respect to the biomass.

The first catalyst composition useful for the purpose of the present invention includes at least one metal, at least one support and at least one solubilizing agent.

The metal used in the first catalyst composition includes but is not limited to group Ib metals, group IIb metals, group IVb metals, group Vb metals, group VIb metals, group VIIb metals, group VIII metals and noble metals. Particularly, the metal is selected from the group consisting nickel (Ni), molybdenum (Mo), cobalt (Co), copper (Cu), silver (Ag), zinc (Zn), zirconium (Zr), vanadium (V), tungsten (W), rhenium (Re), platinum (Pt), palladium (Pd), ruthenium (Ru) and rhodium (Rh).

In accordance with the present disclosure the source of the metal is selected from the group of compounds containing a cation which includes but is not limited to nickel (Ni), molybdenum (Mo), cobalt (Co), zinc (Zn), zirconium (Zr), vanadium (V), tungsten (W), rhenium (Re), platinum (Pt), palladium (Pd), ruthenium (Ru) and rhodium (Rh); and an anion which includes but is not limited to chlorides, bromides, fluorides, iodides, sulfates, phosphates, phosphonates, nitrates, nitrites, carbonates, acetates, bicarbonates, hydroxides and oxides.

The amount of a metal in the catalyst composition ranges from 0.1 to 15 w/w %.

Non-limiting examples of the solubilizing agent present in the catalyst composition includes ammonia solution, piperidine, pyrrolidine, morpholine, piperazine hydrate, 2-methylcyclohexyl amine, cyclohexylamine and hexamethyleneimine. Preferably, the solubilizing agent is hexamethyleneimine. The amount of the solubilizing agent in the catalyst composition of the present disclosure ranges from 4 to 50 wt. %.

The amount of the support in the first catalyst composition ranges from 30 to 96 wt %.

In one embodiment the support is selected from the group consisting of alumina, silica, zirconia, alumina-silica, zeolite and molecular sieves.

In another embodiment the support comprises at least one carrier which includes but is not limited to alumina, silica, zirconia alumina-silica, zeolite and molecular sieves in an amount from 30 and 100 wt % with respect to the support and at least one binder which includes but is not limited to aluminophosphate, pseudoboehmite, alumin oxide, silica and ludox silica solution in an amount from 0.001 to 70 wt % with respect to the support.

Alternatively, the support contains at least one carrier which includes but is not limited to nano-structured aluminum oxide, nano-structured silicon oxide, nano-structured zirconium oxide, nano-structured cerium oxide, nano-structured titanium oxide, nano-structured tantalum oxide in an amount from 30 and 100 wt % with respect to the support and at least one binder which includes but is not limited to aluminophosphate, pseudoboehmite, alumina oxide, silica and ludox silica solution in an amount from 0.001 to 70 wt % with respect to the support.

Still alternatively, the support contains at least one carrier which includes but is not limited to mesoporous zeolites, mesoporous alumino silicate, mesoporous silicalite, mesoporous molecular sieves in an amount from 30 and 100 wt % with respect to the support and at least one binder which includes but is not limited to aluminophosphate, pseudoboehmite, alumina oxide, silica and ludox silica solution in an amount from 0.001 to 70 wt % with respect to the support.

The support employed in the catalyst preparation is in the form selected from the group consisting of extrudate, sphere, pellet and powder. The support utilized has a surface area ranging from 25 to 1000 m$^2$/g, whereas the spheres and pellets have a diameter of 3 to 10 mm.

In one embodiment the support is in the form of extrudates having lengths ranging from 4 to 6 mm and diameter ranging from 1 to 2 mm.

In another embodiment the support is prepared by using at least one carrier, at least one binder and at least one peptizing agent. The peptizing agent is selected from the group consisting of phosphoric acid, acetic acid and combination thereof.

In the third step, the mixture is heated at a temperature ranging from 200 to 350° C. and at a pressure ranging from 70 to 250 bars for a time period ranging from 10 to 180 minutes to obtain a mass containing crude bio oil, a residue and the catalyst. Optionally, the mixture is heated in the presence of at least one hydrogen source selected from the group consisting of $H_2$ and $CH_4$.

In one embodiment, hydrogen gas is fed at an initial pressure ranging from 30-50 bars. During the reaction, the vessel pressure increases to lie in the range of 70-250 bars, depending upon the water vapor pressure and other process conditions.

During the course of heating the biomass breaks down and reforms the chemical building blocks into crude bio oil. The catalyst hydrothermal process employing the catalyst of the present disclosure breaks down the bio macromolecules present in the biomass and promotes removal of heteroatoms to result into crude bio oil. The crude bio oil obtained contains free fatty acids, N-containing heterocyclic compounds, polycyclic aromatics, unsaturated compounds and other undetected heavier molecules and therefore, is not suitable for application. FIG. 1 illustrates a gas chromatogram of crude bio-oil showing the presence of more than 25 compounds in the crude bio-oil. To make the crude bio oil suitable for applications it is upgraded to bio oil by subjecting crude bio oil to reduction process. The crude bio oil, before subjecting to the reduction process is separated from the mass to obtain separated crude bio oil and a sludge containing the residue and the first catalyst. The crude bio oil is extracted by using at least one solvent and then the solvent is evaporated to obtain solvent free crude bio oil. Simultaneously, the first catalyst is recovered from the sludge. The recovery of the catalyst comprises the steps of separating the catalyst from said residue, calcining at a temperature of 500 to 700° C. for a time period of 3 to 7 hours followed by reduction using hydrogen at a temperature of 400 to 600° C. for a time period of 2 to 5 hours to obtain a recovered catalyst. The recovered catalyst can be recycled for the production of crude bio oil or bio-oil or both.

Finally, the solvent free crude bio oil is subjected to reaction in the presence of a second catalyst composition and hydrogen source at a temperature ranging from 200 to 450° C. and at a pressure ranging from 70 to 250 bars for a time period ranging from 10 to 180 minutes to obtain upgraded bio-oil, a residue, the second catalyst. The second catalyst employed for reduction of crude bio oil to obtain upgraded bio-oil is a fresh catalyst having the same composition as that of the first catalyst or a recovered catalyst from the sludge.

In one embodiment, hydrogen gas is fed at an initial pressure ranging from 30-50 bars. During the reaction, the vessel pressure increases to lie in the range of 70-250 bars, depending upon the input hydrogen gas and the formed gaseous hydrocarbons.

The catalyst employed for the production of crude bio oil and up-gradation of the crude bio oil to bio-oil is characterized by:
  i. total acid strength ranging from 0.05 to 3.5 mmole/gm of ammonia; and
  ii. pore width ranging from 1 to 20 nm.

The yield of the crude bio oil obtained by the process of the present disclosure using the catalyst composition as specified above ranges from 45% to 80% and the carbon content of said crude bio oil ranges from 74 to 80%.

The yield of the bio-oil obtained by the process of the present disclosure using the catalyst composition as specified above ranges from 50 to 70%.

The catalyst compositions of the present disclosure are highly stable during hydrothermal liquefaction.

Further, the recovered catalyst of the present disclosure exhibits X-ray diffraction (XRD) pattern similar to the fresh catalyst reflecting the retention of crystalline structure of the catalyst after regeneration. The Brunauer, Emmett and Teller (BET) surface area, metal concentration and decomposition behavior of the regenerated catalysts are similar to that of fresh catalysts showing that the texture of the catalysts is retained during regeneration of the catalyst.

Still further, the recovered catalyst can be recycled for at least 5 times with a performance similar to the fresh catalyst.

The present disclosure is further described in light of the following examples which are set forth for illustration purpose only and not to be construed for limiting the scope of the disclosure.

Example 1

Preparation of a Catalyst Composition

Solution A was prepared by dissolving cobalt acetate (0.863 gm) in water (10 ml) at 30° C. for 10 minutes. Separately, solution B was prepared by dissolving ammonium molybdate (10.41 gm) and hexamethyleneimine (7 gm) in water (70 ml) at 60° C. for 30 minutes at 300 rpm.

Solution A and B were then mixed together at 30° C. To this alumina powder (10 gm) was added and mixed for 2 hours to obtain a mixture. The liquid from the mixture was discarded and the remaining mass was dried at room temperature for 2 hours. This mass was further dried at 120° C. for 10 hours and calcined at 600° C. for 6 hours. The resulting calcined mass was subjected to reduction in the presence of hydrogen at 500° C. for 4 hours to obtain the catalyst (CoMo/$Al_2O_3$).

Example 1A

The process of example 1 was repeated except that 8 gm of ammonia solution (25%) was used instead of hexamethyleneimine (7 gm).

Example 1B

The process of example 1 was repeated except that 8 gm of cyclohexylamine was used instead of hexamethyleneimine (7 gm).

Example 1C

The process of example 1 was repeated except that 8 gm of ammonia solution (25%) was used instead of hexamethyleneimine (7 gm) and zirconia powder was used instead of alumina extrudate.

Example 1D

The process of example 1 was repeated except that 8 gm of cyclohexylamine was used instead of hexamethyleneimine (7 gm) and zirconia powder was used instead of alumina extrudate.

Example 1E

The process of example 1 was repeated except that zirconia powder as used instead of alumina extrudate.

Example 2

Preparation of a Catalyst Composition

Solution A was prepared by dissolving nickel nitrate (1.011 gm) in water (10 ml) at 30° C. for 10 minutes. Separately, solution B was prepared by dissolving ammonium molybdate (10.41 gm) and hexamethyleneimine (7 gm) in water (70 ml) at 60° C. for 30 minutes at 300 rpm.

Solution A and B were then mixed together at 30° C. To this alumina powder (10 gm) was added and mixed for 2 hours to obtain a mixture. The liquid from the mixture was discarded and the remaining mass was dried at room temperature for 2 hours. This mass was further dried at 120° C. for 10 hours and calcined at 600° C. for 6 hours. The resulting calcined mass was subjected to reduction in the presence of hydrogen at 500° C. for 4 hours to obtain the catalyst (NiMo/$Al_2O_3$).

Example 2A

The process of example 2 was repeated except that 7 gm of ammonia solution (25%) was used instead of hexamethyleneimine (7 gm).

Example 2B

The process of example 2 was repeated except that 7 gm of cyclohexylamine was used instead of hexamethyleneimine (7 gm).

Example 3

Preparation of Catalyst Composition

Solution A was prepared by dissolving rhodium chloride (0.381 gm) and hexamethyleneimine (7 gm) in water (100 ml) at 30° C. for 30 minutes at 300 rpm. To this zirconia powder (10 gm) was added and mixed for 2 hours at 30° C. to obtain a mixture. The liquid from the mixture was discarded and the remaining mass was dried at room temperature for 2 hours. This mass was further dried at 120° C. for 10 hours and calcined at 600° C. for 6 hours. The resulting calcined mass was subjected to reduction in the presence of hydrogen at 500° C. for 4 hours to obtain the catalyst (Rh/zirconia).

Example 4A

Catalytic Hydrothermal Liquefaction Using *Nannochloropsis*

21 g *Nannochloropsis* as 20% slurry in water was loaded in an HTHP reactor (capacity: 300 ml). 10 wt. % of powdered CoMo/$Al_2O_3$ catalyst (1.897 g w.r.t. ash and moisture free algae) of the present disclosure was added to the reactor. The reactor was then closed. Leak check was done using nitrogen at 120 bar. Nitrogen pressure was released and the required amount of hydrogen (35 bar) was filled and heated to reaction temperature (350° C.) with 500 rpm stirring speed. Upon reaching the temperature, the reactor was kept under the same condition for 30 min. It was then cooled with chilled water facility and the gas was collected for gas analysis. The reactor was opened and the product was collected in a beaker. Oil, aqueous and solid phases were separated and measured individually. The mixture was filtered using a Buckner flask. The obtained powder was washed with Dichloromethane and water and then dried. The liquids (oil and aqueous phase) were separated by solvent extraction method.

Example 4B

Catalytic Hydrothermal Liquefaction Using *Chlorella*

21 g *chlorella* as 20% slurry in water was loaded in an HTHP reactor (capacity: 300 ml). 10 wt. % of powdered CoMo/$Al_2O_3$ catalyst (1.897 g w.r.t. ash and moisture free algae) of the present disclosure was added to the reactor. The reactor was then closed. Leak check was done using nitrogen at 120 bar. Nitrogen pressure was released and the required amount of hydrogen (35 bar) was filled and heated to reaction temperature (350° C.) with 500 rpm stirring speed. Upon reaching the temperature, the reactor was kept under the same condition for 30 min. It was then cooled with chilled water facility and the gas was collected for gas analysis. The reactor was opened and the product was collected in a beaker. Oil, aqueous and solid phases were separated and measured individually. The mixture was filtered using a Buckner flask. The obtained powder was washed with Dichloromethane and water and then dried. The liquids (oil and aqueous phase) were separated by solvent extraction method.

Example 5

The process of example 4A and 4B was repeated using 10 wt. % of powdered NiMo/$Al_2O_3$ catalyst obtained in example 2.

Example 6

The process of example 4A and 4B was repeated using 10 wt. % of powdered Rh/$ZrO_2$ catalyst obtained in example 3.

Example 7

Catalytic Hydrothermal Liquefaction Using *Spirulina*

23 g of *Spirulina* as 20% slurry in water loaded in a reactor (HTHP reactor, capacity: 300 ml). 10 wt. % of powdered CoMo/$Al_2O_3$ catalyst (1.897 g w.r.t. ash and moisture free algae) of the present disclosure was added to the reactor. The reactor was then closed. Leak check was done using nitrogen at 120 bar. The nitrogen pressure was released and the required amount of hydrogen (35 bar) was filled and heated to reaction temperature (350° C.) with 500 rpm stirring speed. Upon reaching the temperature, the reactor was kept under the same conditions for 30 min. It was then cooled with chilled water facility and the gas was collected for gas analysis. The reactor was opened and the product was collected in a beaker. Oil, aqueous and solid phases were separated and measured individually. The mixture was filtered using a Buckner flask. The powder was washed with Dichloromethane and water and dried. The liquids (Oil and aqueous phase) were separated by gravimetric method.

Example 8

The process of example 7 was repeated using 10 wt. % of powdered NiMo/$Al_2O_3$ obtained in example 2.

Example 9

The process of example 7 was repeated using 10 wt. % of powdered Rh/$ZrO_2$ obtained in example 3.

The comparative results of % HTL oil yield for conventional methods (without catalyst/with commercial catalysts) vis-à-vis catalysts of the present disclosure are provided in the Table No. 1:

Yield (%) of HTL oil was calculated as weight of oil product×100/weight of moisture and ash free algae in the HTL slurry.

TABLE NO. 1

| | % Crude Bio Oil yield | | |
|---|---|---|---|
| Catalysts | Nannochloropsis | Spirulina | Chlorella |
| Without catalyst | 58 | 46 | — |
| CoMo/$Al_2O_3$ (Commercial) | 68 | 48 | — |
| NiMo/$Al_2O_3$ (Commercial) | 65 | 48 | — |
| Present (CoMo/$Al_2O_3$ + hexamethyleneimine) Example 1 | 73 | 57 | 59 |
| Present (NiMo/$Al_2O_3$ + hexamethyleneimine) Example 2 | 69 | 55 | 56 |
| Present (Rh/$ZrO_2$ + hexamethyleneimine) Example 3 | 71 | 55 | 45 |
| Present (CoMo/$ZrO_2$ + hexamethyleneimine) Example 1E | 71 | 61 | — |
| Present (CoMo/$Al_2O_3$ + 25% ammonia solution) Example 1A | 63 | 51 | 49 |
| Present (CoMo/$Al_2O_3$ + cyclohexylamine) Example 1B | 60 | 50 | 50 |
| Present (NiMo/$Al_2O_3$ + 25% ammonia solution) Example 2A | 60 | 51 | 48 |
| Present (NiMo/$Al_2O_3$ + cyclohexylamine) Example 2B | 61 | 52 | 49 |
| Present (CoMo/$ZrO_2$ + 25% ammonia solution) Example 1C | 63 | — | — |
| Present (CoMo/$ZrO_2$ + cyclohexylamine) Example 1D | 61 | — | — |

From the results, it is clear that % HTL oil yield by the process of the present disclosure which utilizes a catalyst comprising a solubilizing agent is 48 to 73%. Whereas, the % HTL oil yield using the commercial catalyst (which is devoid of a solubilizing agent) ranges from 48 to 68%.

It is particularly found that when a catalyst comprising hexamethyleneimine as a solubilizing agent is utilized for liquefaction of high lipid *Nannochloropsis* algae, % HTL oil yield is 69 to 73%. Thus, when hexamethyleneimine is used as a solubilizing agent, the process of the present disclosure provides high yield of crude bio oil than the crude bio oil yield obtained by the process which utilize commercial catalyst.

The following examples illustrate preparation of the extruded form of the catalyst composition using extruded support which may be recycled and regenerated as per process of the present disclosure:

Example-10: Preparation of Support

Example 10

A: Alumina Support Preparation (10 g Batch)
Pseudoboehmite (4.0 g) and alumina (7.0 g) were taken. To this, 6 ml of diluted solution of orthophosphoric acid was mixed to obtain aluminophosphate gel. This gel was mixed in a mortar-pestle and pegged to extrudable dough.

B: Alumina Support Preparation (10 g Batch)
Pseudoboehmite (4.0 g) and alumina (7.0 g) were taken. To this, 7 ml of diluted solution of acetic acid was mixed to obtain aluminum acetate gel. This gel was mixed in a mortar-pestle and pegged to extrudable dough.

C: Zirconia Support Preparation (10 g Batch)
Zirconium hydroxide powder (14.0 g) and Pseudoboehmite alumina (4.0 g) were mixed. Diluted solution of orthophosphoric acid (6 ml) was added while mixing to prepare Zirconium phosphate gel. This gel was mixed in a mortar-pestle and pegged to extrudable dough.

D: Zirconia Support Preparation (10 g Batch)
Zirconium hydroxide powder (14.0 g) and Pseudoboehmite alumina (4.0 g) were mixed. Diluted solution of acetic acid (7 ml) was added while mixing to prepare Zirconium acetate gel. This gel was mixed in a mortar-pestle and pegged to extrudable dough.

E: Zeolite Support Preparation (10 g Batch)
To make zeolite extrudates, Pseudoboehmite alumina (4.0 g) and diluted solution of orthophosphoric acid (6 ml) were mixed thoroughly with a mixture of zeolite powder (7.0 g) and hydroxypropylmethyl cellulose (HPMC, 0.1 g) in a mortar-pestle and pegged to extrudable dough.

Upon making the above said dough, it was passed through extruder/nodulizer and obtained extrudates like wires. It was then dried at room temperature for 2 hours followed by 120° C. for 6 hours. Finally, it was calcined at 540-600° C. in presence of air for 6 hours in an air flow.

Example 11

A]
Preparation of a Catalyst Composition
Dispersion A was prepared by dissolving cobalt acetate (0.863 g) in water (10 ml) at 30° C. for 10 minutes. Separately, dispersion B was prepared by dissolving ammonium molybdate (10.41 g) and hexamethyleneimine (7 g) in water (70 ml) at 60° C. for 30 minutes at 300 rpm.
Dispersions A and B were then mixed together at 30° C. To this alumina support of example 10 A (10 gm) was added and mixed for 2 hours to obtain a mixture. The liquid from the mixture was discarded and the remaining mass was dried at room temperature for 2 hours. This mass was further dried at 120° C. for 10 hours and calcined in presence of air at 600° C. for 6 hours. The resulting calcined mass was subjected to reduction in the presence of hydrogen at 500° C. for 4 hours to obtain the catalyst (CoMo/$Al_2O_3$).

B]
The process of example 11A was repeated except that 8 g of ammonia solution (25%) was used instead of hexamethyleneimine (7 g).

C]
The process of example 11A was repeated except that 8 g of cyclohexylamine was used instead of hexamethyleneimine (7 g).

Example 12

A]
The process of example 11A was repeated except that 8 g of ammonia solution (25%) was used instead of hexamethyleneimine (7 g) and zirconia support of example 100 was used instead of alumina support.

B]
The process of example 11A was repeated except that 8 gm of cyclohexylamine was used instead of hexamethyleneimine (7 g) and zirconia support of example 10 C was used instead of alumina support.

C]
The process of example 11A was repeated except that zirconia support of 10D was used instead of alumina support.

D]
The process of example 11A was repeated except that Zeolite support of example 10 E was used instead of alumina support.

Example 13

A] Preparation of a Catalyst Composition
Dispersion A was prepared by dissolving nickel nitrate (1.011 g) in water (10 ml) at 30° C. for 10 minutes. Separately, dispersion B was prepared by dissolving ammonium molybdate (10.41 g) and hexamethyleneimine (7 g) in water (70 ml) at 60° C. for 30 minutes at 300 rpm.
Dispersions A and B were then mixed together at 30° C. To this alumina support of example 10 A (10 g) was added and mixed for 2 hours to obtain a mixture. The liquid from the mixture was discarded and the remaining mass was dried at room temperature for 2 hours. This mass was further dried at 120° C. for 10 hours and calcined at 600° C. in presence of air for 6 hours. The resulting calcined mass was subjected to reduction in the presence of hydrogen at 500° C. for 4 hours to obtain the catalyst (NiMo/$Al_2O_3$).

B]
The process of example 13A was repeated except that 7 g of ammonia solution (25%) was used instead of hexamethyleneimine (7 g).

C]
The process of example 13A was repeated except that 7 g of cyclohexylamine was used instead of hexamethyleneimine (7 g).

Example 14

Preparation of Catalyst Composition
Dispersion A was prepared by dissolving rhodium chloride (0.381 g) and hexamethyleneimine (7 g) in water (100 ml) at 30° C. for 30 minutes at 300 rpm. To this zirconia support obtained in 10C (10 g) was added and mixed for 2 hours at 30° C. to obtain a mixture. The liquid from the mixture was discarded and the remaining mass was dried at room temperature for 2 hours. This mass was further dried at 120° C. for 10 hours and calcined in presence of air at 600° C. for 6 hours. The resulting calcined mass was subjected to reduction in the presence of hydrogen at 500° C. for 4 hours to obtain the catalyst (Rh/Zirconia).

Example 15

Catalytic Hydrothermal Liquefaction Using *Nannochloropsis*

21 g *Nannochloropsis* as 20% slurry in water loaded in an HTHP reactor (capacity: 300 ml). 10 wt. % of extruded CoMo/$Al_2O_3$ catalyst, obtained in example 11A (1.897 g w.r.t. ash and moisture free algae) of the present disclosure was added to the reactor. The reactor was then closed. Leak check was done using nitrogen at 120 bar. Nitrogen pressure was released and the required amount of hydrogen (35 bar) was filled and heated to reaction temperature (350° C.) with 500 rpm stirring speed. Upon reaching the temperature, the reactor was kept under the same condition for 30 min. It was then cooled with chilled water facility and the gas was collected for gas analysis. The reactor was opened and the product was collected in a beaker. Oil, aqueous and solid phases were separated and measured individually. The mixture was filtered using a Buckner flask. The powder was washed with Dichloromethane and water and dried. The liquids (oil and aqueous phase) were separated by solvent extraction method.

Example 16

The process of example 15 was repeated using 10 wt. % of extruded NiMo/Al$_2$O$_3$ catalyst, obtained in example 13A.

Example 17

The process of example 15 was repeated using 10 wt. % of extruded Rh/ZrO$_2$ catalyst obtained in example 14.

Example 18

Catalytic Hydrothermal Liquefaction Using *Spirulina*

23 g of *Spirulina* as 20% slurry in water was loaded in a reactor (HTHP reactor, capacity: 300 ml). 10 wt. % of extruded CoMo/Al$_2$O$_3$ catalyst, obtained in example 11A (1.897 g w.r.t. ash and moisture free algae) of the present disclosure was added to the reactor. The reactor was then closed. Leak check was done using nitrogen at 120 bar. The nitrogen pressure was released and the required amount of hydrogen (35 bar) was filled and heated to reaction temperature (350° C.) with 500 rpm stirring speed. Upon reaching the temperature, the reactor was kept under the same conditions for 30 min. It was then cooled with chilled water facility and the gas was collected for gas analysis. The reactor was opened and the product was collected in a beaker. Oil, aqueous and solid phases were separated and measured individually. The mixture was filtered using a Buckner flask. The powder was washed with Dichloromethane and water and dried. The liquids (Oil and aqueous phase) were separated by gravimetric method.

Example 19

The process of example 18 was repeated using 10 wt. % of extruded NiMo/Al$_2$O$_3$ obtained in example 13A.

Example 20

The process of example 18 was repeated using 10 wt. % of extruded Rh/ZrO$_2$ obtained in example 14.

Example 21

Recovery of the Catalyst

The solid residue obtained in example 15 was subjected to sieving to separate the catalyst. The obtained catalyst was then subjected to calcination at 600° C. and then subjected to reduction in the presence of hydrogen at 500° C. to obtain a catalyst ready for recycle.

Example 22

The process of example 21 was repeated except that the solid residue obtained in example 16 was used.

Example 23

Recycling of the Catalyst

The catalyst recovered as per example 21 was used for hydrothermal liquefaction of microalgae. The process of example 15 was repeated.

The comparative results of % crude bio oil yield are provided in the Table No. 2.

TABLE NO. 2

| | Crude Bio Oil Yield (%) | | | |
| --- | --- | --- | --- | --- |
| | Algae, *Nannochloropsis* | | Algae, *Spirulina* | |
| Runs | CoMo/Al2O3 obtained in example 11 | NiMo/Al2O3 obtained in example 13 | CoMo/Al2O3 obtained in example 11 | NiMo/Al2O3 obtained in example 13 |
| Catalyst - 1(Fresh) | 70 | 68 | 57 | 55 |
| 1st Regeneration | 69 | 68 | 57 | 56 |
| 2nd Regeneration | 70 | 67 | 58 | 57 |
| 3rd Regeneration | 68 | 69 | 56 | 55 |
| 4th Regeneration | 69 | 68 | 56 | 56 |
| 5th Regeneration | 70 | 68 | 57 | 55 |

The comparative properties of the fresh and recovered catalyst are provided in Table No. 3.

TABLE NO. 3

| Sr. No. | Catalyst Name | XRD (Crystallinity) | BET, m$^2$/g | Pore volume (cc/g) | Pore diameter (Å) | NH3-TPD (mmol/g) | TGA (% wt loss upto 900° C.) |
| --- | --- | --- | --- | --- | --- | --- | --- |
| 1 | Catalyst-1 (Fresh), prepared as per example 11A | Quasi crystalline | 176 | 0.496 | 98 | 0.842 | 7.20 |
| 2 | Catalyst-2 (Regenerated), | Quasi crystalline | 170 | 0.479 | 101 | 0.813 | 9.55 |

TABLE NO. 3-continued

| Sr. No. | Catalyst Name | XRD (Crystallinity) | BET, m²/g | Pore volume (cc/g) | Pore diameter (Å) | NH3-TPD (mmol/g) | TGA (% wt loss upto 900° C.) |
|---|---|---|---|---|---|---|---|
| 3 | Catalyst-3 (Fresh) prepared as per example 21 | Quasi crystalline | 181 | 0.503 | 96 | 0.812 | 11.42 |
| 4 | Catalyst-4 (Regenerated) prepared as per example 13A example 22 | Quasi crystalline | 165 | 0.455 | 100 | 0.805 | 9.28 |

Yield (%) of crude bio oil was calculated as weight of oil product×100/weight of moisture and ash free algae.

From the results, it is clear that % crude bio oil yield by using the regenerated catalyst of the present disclosure is similar to that of fresh catalysts.

The following examples illustrate preparation of the catalyst composition using nano-structured support of the present disclosure.

Preparation of Nano-Structured Support:

Example 24

Solution A was prepared by dissolving 8 g of Pluronic-123 (poly(ethylene oxide)-poly(propylene oxide)-poly(ethylene oxide)) in 75 g of ethyl alcohol, Separately, Solution B was prepared by dissolving 16 g aluminum iso-propoxide (Al(OPri)3 in the mixture of 10 ml 60% nitric acid and 70 g ethyl alcohol.

Solution B was added to Solution A with stirring. Stirring was continued for 4 h at room temperature. The resultant solution was kept in oven at 60° C. for 72 h for evaporation of ethanol and for crystallization. The final powdered nano-structured aluminum oxide was further dried at 110° C. for 6 h. The nano-structured material was obtained by removing Pluronic-123 by calcining at 540° C. for 6 h under the flow of air.

This calcined material was used as a support for the preparation of a catalyst composition by the process as described for examples 11-14.

Example 25

In-situ synthesis of mono or multi metallic catalysts of nano-structured aluminum oxide were synthesized by following the same method as described in Example 24. The required amounts of metal salts such as cobalt acetate or nickel acetate with ammonium molybdate, etc. were added during preparation of Solution B. After metal loading, samples were calcined at 540° C. in air and followed by reduced at 500° C. in H2.

Example 26

For the preparation of nano-structured zirconium oxide, Solution A was prepared by dissolving 7.5 g of Cetyltrimethylammonium bromide (CTAB) in 25 g of distilled water. Further, 0.5 g of trimethylammonium hydroxide (TMAOH) was added and stirred for 30 min. Solution B was prepared by mixing 53 g of 1-butanol with 33 g of 80% solution of zirconium (iv) butoxide. Solution B was added drop wise into solution A with vigorous stirring to obtain a gel. pH of the gel was adjusted to 10.5-11. Gel was stirred for 2 h at RT and then it was transferred to 500 ml round bottom flask and refluxed at 90° C. for 48 h to obtain nano-structured zirconium oxide was collected by filtration and washing using distilled water. Solid powder of nano-structured zirconium oxide was dried at 110° C. for 6 h and calcined at 600° C. for 6 h under the flow of air.

This calcined material was used as catalyst support for the preparation of a catalyst composition by the process as described for examples 11-14.

Example 27

In-situ synthesis of mono or multi metallic catalysts of nano-structured zirconium oxide were synthesized by following the same method as described in Example 26. Metal salts such as cobalt acetate or nickel acetate with ammonium molybdate, etc. were prepared as solution C and added upon addition of solution B into solution A. After metals loading, samples were calcined at 540° C. in air and followed by reduced at 500° C. in H2.

The catalysts synthesized in examples 24-27 were used for the conversion of Bio-mass to crude bio-oil as per the procedure described in example 4 for algal species *Nannochloropsis* and example 7 for algal species *Spirulina*. The results are depicted in Table No. 4.

TABLE NO. 4

| Catalyst Name | Algae Species | CBO Yield, % |
|---|---|---|
| No Catalyst | *Spirulina* | 48 |
| CoMo/gamma Alumina | *Spirulina* | 57 |
| CoMo/Nano-structured alumina (Example 24) | *Spirulina* | 56 |
| In-situ CoMo/Nano-structured alumina (Example 25) | *Spirulina* | 60 |
| CoMo/Nano-structured zirconia (Example 26) | *Spirulina* | 59 |
| In-situ CoMo/Nano-structured zirconia (Example 27) | *Spirulina* | 62 |
| No Catalyst | *Nannochloropsis* | 58 |
| CoMo/gamma Alumina | *Nannochloropsis* | 68 |
| CoMo/Nano-structured alumina (Example 24) | *Nannochloropsis* | 67 |
| In-situ CoMo/Nano-structured alumina (Example 25) | *Nannochloropsis* | 70 |
| CoMo/Nano-structured zirconia (Example 26) | *Nannochloropsis* | 65 |
| In-situ CoMo/Nano-structured zirconium oxide (Example 27) | *Nannochloropsis* | 68 |
| CoMo/Nano-structured zirconium oxide (Example 26) | *Nannochloropsis** | 75 |

*Slurry concentration - 35%

The following example illustrates preparation of the catalyst composition using mesoporous zeolite support of the present disclosure.

Example 28

For the preparation of meso-porous zeolite, Solution A was prepared using 6 g of Cetyltrimethylammonium bromide (CTAB) in 450 g of distilled water. Further, 28.5 ml of ammonium hydroxide (NH4OH) was added and stirred for 30 min. In the above solution, 8 g of zeolite power was added, stirred at room temperature for 20 min and then hydrothermally treated at 120-180° C. for 10-24 h. This was cooled, filtered and washed to obtain final meso-porous zeolite in the powder form. The powder was dried at 110° C. for 6 h and calcined at 600° C. for 6 h under the flow of air. This calcined material was used as catalyst composition by the process as described for examples 11-14.

The catalyst synthesized in example 28 was used for the conversion of Bio-mass to crude bio-oil as per the procedure described in example 4A for algae species *Nannochloropsis* and example 7 for algae species *Spirulina*. The results are depicted in Table No. 5.

TABLE NO. 5

| Algae | Catalyst | CBO Yield, % |
|---|---|---|
| *Nannochloropsis* | No Catalyst | 57 |
| *Nannochloropsis* | Neat Meso-porous Zeolite | 61 |
| *Nannochloropsis* | CoMo/Meso-porous Zeolite (Example 28) | 71 |
| *Spirulina* | No Catalyst | 46 |
| *Spirulina* | Neat Mesoporous Zeolite | 50 |
| *Spirulina* | CoMo/Mesoporous Zeolite (Example 28) | 61 |

Upgradation

To obtain the desired upgraded crude bio oil which will be equivalent to petroleum crude oil, upgradation of crude bio oil to bio-oil is essential. During the upgradation reaction, maximum number of heteroatoms were removed from oil components so that hydrocarbons only with carbon and hydrogen are obtained. FIG. 2 illustrates a gas chromatogram of the upgraded bio-oil, showing the presence of about 12 compounds, all of which relate to hydrocarbons. The major peaks relate to ethylbenzene/xylene, nonane, decane, undecane, dodecane, tridecane, tetradecane, pentadecane, hexadecane, heptadecane, eicodecane and nonadecane. Peaks related to sulfur and nitrogen compounds were either absent or insignificant.

Example 29

$CoMo/Al_2O_3$ catalyst described in Example 1 was used for upgradation study. In a typical experimental condition, 40 g of *Spirulina* crude bio oil of Example 7 was loaded in the reactor with 10 wt. % of catalysts. Leak check was done using nitrogen. Required amount of hydrogen (35-50 bars) was filled and heated to reaction temperature (425° C.) with 500 rpm stirring speed. Upon reaching the temperature, reaction conditions were maintained for 30 min. The reactor was then cooled with chilled water and gas was collected for analysis. Upgraded bio oil, solid mass and catalyst were collected separately. Upgraded bio oil was subjected to Simulated Distillation to ascertain its chemical properties.

Example 30

$NiMo/Al_2O_3$ catalyst described in Example 2 was used for upgradation study. In a typical experimental condition, 40 g of *Spirulina* crude bio oil of Example 8 was loaded in the reactor with 10 wt % of catalysts. Leak check was done using hydrogen. Required amount of hydrogen (35-50 bars) was filled and heated to reaction temperature (375° C.) with 500 rpm stirring speed. Upon reaching the temperature, reaction conditions were maintained for 30 min. The reactor was then cooled with chilled water and gas was collected for analysis. Upgraded bio oil, solid mass and catalyst were collected separately. Upgraded bio oil was subjected to Simulated Distillation to ascertain its chemical properties.

Example 31

$CoMo/Al_2O_3$ catalyst described in Example 1 was used for upgradation study. In a typical experimental condition, 25 g of *Nannochloropsis* crude bio oil of Example 15 was loaded in the reactor with 10 wt. % of catalysts. Leak check was done using nitrogen. Required amount of hydrogen (35-50 bars) was filled and heated to reaction temperature (425° C.) with 500 rpm stirring speed. Upon reaching the temperature, reaction conditions were maintained for 30 min. The reactor was then cooled with chilled water and gas was collected for analysis. Upgraded bio oil, solid mass and catalyst were collected separately. Upgraded bio oil was subjected to Simulated Distillation to ascertain its chemical properties.

Example 32

$NiMo/Al_2O_3$ catalyst described in Example 2 was used for upgradation study. In a typical experimental condition, 40 g of *Nannochloropsis* crude bio oil of Example 16 was loaded in the reactor with 10 wt. % of catalysts. Leak check was done using nitrogen. Required amount of hydrogen (35-50 bars) was filled and heated to reaction temperature (375° C.) with 500 rpm stirring speed. Upon reaching the temperature, reaction conditions were maintained for 30 min. The reactor was then cooled with chilled water and gas was collected for analysis. Upgraded bio oil, solid mass and catalyst were collected separately. Upgraded bio oil was subjected to Simulated Distillation to ascertain its chemical properties.

Example 33

In-situ synthesized CoMo/nano-structured $Al_2O_3$ catalyst described in Example 25 was used for upgradation study. In a typical experimental condition, 40 g of *Spirulina* crude bio oil of Example 8 was loaded in the reactor with 10 wt. % of catalyst. Leak check was done using hydrogen. Required amount of hydrogen (35-50 bars) was filled and heated to reaction temperature (375° C.) with 500 rpm stirring speed. Upon reaching the temperature, reaction conditions were maintained for 30 min. The reactor was then cooled with chilled water and gas was collected for analysis. Upgraded bio oil, solid mass and catalyst were collected separately. Upgraded bio oil was subjected to Simulated Distillation to ascertain its chemical properties.

Example 34

In-situ synthesized CoMo/nano-structured Zirconia catalyst described in Example 27 was used for upgradation study. In a typical experimental condition, 40 g of *Spirulina* crude bio oil of Example 8 was loaded in the reactor with 10 wt. % of catalyst. Leak check was done using hydrogen. Required amount of hydrogen (35-50 bars) was filled and heated to reaction temperature (375° C.) with 500 rpm stirring speed. Upon reaching the temperature, reaction conditions were maintained for 30 min. The reactor was then cooled with chilled water and gas was collected for analysis. Upgraded bio oil, solid mass and catalyst were collected separately. Upgraded bio oil was subjected to Simulated Distillation to ascertain its chemical properties.

Example 35

CoMo/mesoporous zeolite catalyst described in Example 28 was used for upgradation study. In a typical experimental condition, 40 g of *Spirulina* crude bio oil of Example 8 was loaded in the reactor with 10 wt. % of catalyst. Leak check was done using hydrogen. Required amount of hydrogen (35-50 bars) was filled and heated to reaction temperature (375° C.) with 500 rpm stirring speed. Upon reaching the temperature, reaction conditions were maintained for 30 min. The reactor was then cooled with chilled water and gas was collected for analysis. Upgraded bio oil, solid mass and catalyst were collected separately. Upgraded bio oil was subjected to Simulated Distillation to ascertain its chemical properties and results are provided in Table No. 6.

TABLE NO. 6

| Catalyst | crude bio oil used | UBO yield (%) | Solid yield (%) |
|---|---|---|---|
| CoMo/Al2O3 | *Spirulina* crude bio oil of example 7 | 70 | 18 |
| NiMo/Al2O3 | *Spirulina* crude bio oil of example 8 | 65 | 28 |
| CoMo/Al2O3 | *Nannochloropsis* crude bio oil of example 4 | 52 | 36 |
| NiMo/Al2O3 | *Nannochloropsis* crude bio oil of example 5 | 65 | 27 |
| In-situ CoMo/Nano-structured alumina (Example 25) | *Spirulina* crude bio oil of example 7 | 63 | 27 |
| In-situ CoMo/Nano-structured zirconia (Example 27) | *Spirulina* crude bio oil of example 7 | 67 | 22 |
| CoMo/Mesoporous Zeolite (Example 28) | *Spirulina* crude bio oil of example 7 | 66 | 25 |

The obtained crude bio oil and bio-oil were subjected to high temperature distillation separately, to ascertain their chemical properties. The results of high temperature simulated distillation patterns of CBO (crude bio oil) and UBO are provided in Table No. 7. The upgraded bio-oil (UBO) shows lower distillation temperatures, indicating higher purity, due to the removal of heteroatoms such as oxygen, nitrogen, sulfur and phosphorus.

TABLE NO. 7

| Recovered Mass (%) | Temp (° C.) for CBO | Temp (° C.) for UBO |
|---|---|---|
| 1 | 145 | 63 |
| 10 | 212 | 158 |
| 20 | 260 | 205 |
| 30 | 304 | 236 |
| 40 | 351 | 268 |
| 50 | 380 | 287 |
| 60 | 416 | 309 |
| 70 | 461 | 347 |
| 80 | 510 | 401 |
| 90 | 570 | 488 |
| 100 | 704 | 683 |

Technical Advance and Economic Significance:

The present disclosure provides a simple, energy efficient, time saving and high yielding process production of crude bio and its up-gradation to bio-oil using a fresh or regenerated catalyst.

The present disclosure provides a process which is capable of producing bio-oil compatible with petroleum crude oil.

The present disclosure provides a process which is capable of producing bio oil containing high carbon content.

The present disclosure provides bio-oil which is free from heteroatoms such as oxygen, nitrogen, sulfur and phosphorus.

The upgradation of crude bio oil to bio-oil in accordance with the present process is carried out in the absence of solvent.

The process steps of conversion of biomass into crude bio oil and subsequent upgradation of crude bio oil to bio-oil are carried out at same temperature and pressure conditions.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for the production of bio-oil; said process comprising the following steps:
   a. preparing and/or collecting a biomass slurry;
   b. adding a first catalyst composition in an amount ranging from 1 to 20 wt % with respect to the biomass in said slurry to obtain a mixture;
   c. heating the mixture at a temperature ranging from 200 to 350° C. and at a pressure ranging from 70 to 250 bars for a time period ranging from 10 to 180 minutes to obtain a mass containing crude bio oil, a residue and the first catalyst;

d. separating the crude bio oil from said mass to obtain a separated crude bio oil and a sludge containing the residue and the first catalyst composition; extracting said separated crude bio oil with at least one solvent and evaporating said solvent to obtain a solvent free crude bio oil;

e. subjecting said solvent free crude bio oil to a reaction in the presence of a second catalyst composition and a hydrogen source at a temperature ranging from 200 to 450° C. and at a pressure ranging from 70 to 250 bars for a time period ranging from 10 to 180 minutes to obtain the bio-oil, a residue and the second catalyst; wherein the second catalyst employed in step (e) is a fresh first catalyst or the first catalyst recovered from the sludge formed in step (d).

2. The process as claimed in claim 1, wherein the method step (d) further comprises recovering said first catalyst from said sludge.

3. The process as claimed in claim 1, wherein the concentration of the biomass in the slurry ranges from 5 to 35 wt %.

4. The process as claimed in claim 1, wherein the biomass is selected from the group consisting of organic waste, agricultural residue, urban refuse, land and water based plant material and microorganisms.

5. The process as claimed in claim 1, wherein the biomass is at least one algae division selected from the group of divisions consisting of Rhodophyta, Chiorophyta, Phaeophyta, Chrsophyta, Cryptophyta, Dinophyta, Tribophyta, Glaucophyta, Charophyta, Ochrophyta, Protista and Blue green algae (Cyanobacteria).

6. The process as claimed in claim 1, wherein the biomass is at least one algae selected from the group consisting of *Spirulina, Nannochloropsis, Chlorella, Euglena, Microcystis, Diclyosphaerium Anabaena, Nodularia, Oscillatoria, Spirogyra, hydrodictyon, Chara, Nitella, Oedognium* and *Phormidium*.

7. The process as claimed in claim 1, wherein the carbon content of said crude bio oil ranges between 74 and 80%.

8. The process as claimed in claim 1, wherein the first or the second catalyst composition comprises:
   i. at least one metal in an amount of 0.1 to 15 wt. %, wherein the metal is selected from the group consisting of group Ib, group IIb metals, group IVb metals, group Vb metals, group VIb metals, group VIIb metals, group VIII metals and noble metals;
   ii. at least one support in an amount of 30 to 96 wt %; and
   iii. at least one solubilizing agent in an amount of 4 to 50 wt. %, said solubilizing agent is selected from the group consisting of ammonia solution, piperidine, pyrrolidine, morpholine, piperazine hydrate, 2-methylcyclohexyl amine, cyclohexylamine and hexamethyleneimine.

9. The process as claimed in claim 8, wherein said support is selected from the group consisting of alumina, silica, zirconia, alumina-silica, zeolite and molecular sieves.

10. The process as claimed in claim 8, wherein said support comprises a) 30 to 100 wt % of at least one carrier selected from the group consisting of alumina, silica, zirconia, alumina-silica, zeolite and molecular sieves; b) 0.001 to 70 wt % of at least one binder selected from the group consisting of aluminophosphate, psuedoboehmite, alumina oxide, silica and ludox silica solution.

11. The process as claimed in claim 8, wherein said support comprises a) 30 to 100 wt % of at least one carrier selected from the group consisting of nano-structured aluminum oxide, nano-structured silicon oxide, nano-structured zirconium oxide, nano-structured cerium oxide, nano-structured titanium oxide, nano-structured tantalum oxide; b) 0.001 to 70 wt % of at least one binder selected from the group consisting of aluminophosphate, psuedoboehmite, alumina oxide, silica and ludox silica solution.

12. The process as claimed in claim 8, wherein said support comprises a) 30 to 100 wt % of at least one carrier selected from the group consisting of mesoporous zeolites, mesoporous alumino silicate, mesoporous silicalite, mesoporous molecular sieves; b) 0.001 to 70 wt % of at least one binder selected from the group consisting of aluminophosphate, psuedoboehmite, alumina oxide, silica and ludox silica solution.

13. The process as claimed in claim 8, wherein the metal is selected from the group consisting of nickel (Ni), molybdenum (Mo), cobalt (Co), copper (Cu), silver (Ag), zinc (Zn), zirconium (Zr), vanadium (V), tungsten (W), rhenium (Re), platinum (Pt), palladium (Pd), ruthenium (Ru) and rhodium (Rh).

14. The process as claimed in claim 8, wherein the support is in the form selected from the group of extrudates, spheres, pellets and powder.

15. The process as claimed in claim 8, wherein the support is in the form of extrudates and has a length ranging from 4 to 6 mm, a diameter ranging from 1 to 2 mm and a surface area ranging from 25 to 1000 $m^2$/gm.

16. The process as claimed in claim 8, wherein the catalyst composition is characterized by:
   i. total acid strength ranging from 0.05 to 3.5 mmole/gm of ammonia; and
   ii. pore width ranging from 1 to 20 nm.

17. The process as claimed in claim 8, wherein the support is in the form of spheres or pellets comprising a diameter ranging from 3 to 10 mm.

* * * * *